(12) United States Patent  (10) Patent No.: US 8,801,000 B1
Power  (45) Date of Patent: Aug. 12, 2014

(54) TRAILER AXLE SUSPENSION SYSTEM AND A METHOD OF CONTROL

(71) Applicant: ArvinMeritor Technology, LLC, Troy, MI (US)

(72) Inventor: Michael Andrew Power, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 1 day.

(21) Appl. No.: 13/767,950

(22) Filed: Feb. 15, 2013

(51) Int. Cl.
*B60G 17/005* (2006.01)

(52) U.S. Cl.
USPC .......................................... 280/6.151; 701/37

(58) Field of Classification Search
CPC .............................. B62D 63/06; B60G 2300/04
USPC ........................................................ 280/6.151
See application file for complete search history.

(56) References Cited

U.S. PATENT DOCUMENTS

| | | | |
|---|---|---|---|
| 4,335,901 A * | 6/1982 | Gladish ........................ | 280/6.151 |
| 4,619,578 A * | 10/1986 | Routledge .................... | 414/498 |
| 5,374,151 A * | 12/1994 | Matthews ..................... | 414/392 |
| 6,199,876 B1 * | 3/2001 | Eckelberry ................. | 280/6.151 |
| 6,412,789 B1 * | 7/2002 | Pierce et al. ............... | 280/6.151 |
| 6,634,655 B2 * | 10/2003 | Eckelberry ................. | 280/6.151 |
| 6,715,778 B2 * | 4/2004 | Gottschalk et al. ..... | 280/124.157 |
| 6,786,509 B2 * | 9/2004 | Lang et al. ................. | 280/754 |
| 6,830,250 B2 * | 12/2004 | Cervantez et al. ......... | 280/5.501 |
| 6,935,625 B2 * | 8/2005 | Bolt et al. ................... | 267/64.16 |
| 7,192,012 B2 * | 3/2007 | Bolt et al. ................... | 267/64.16 |
| 7,226,057 B2 * | 6/2007 | Eichhorn et al. ........... | 280/6.153 |
| 7,630,806 B2 * | 12/2009 | Breed ............................ | 701/45 |
| 8,155,835 B2 * | 4/2012 | Holbrook ....................... | 701/37 |
| 8,447,474 B2 * | 5/2013 | Breed ........................... | 701/46 |
| 2002/0096840 A1 * | 7/2002 | Sulzyc et al. .............. | 280/5.514 |
| 2002/0113382 A1 * | 8/2002 | Dosdall ...................... | 280/6.151 |
| 2004/0070160 A1 * | 4/2004 | Eberling et al. .......... | 280/124.16 |
| 2005/0242665 A1 * | 11/2005 | Goebels ....................... | 303/191 |
| 2006/0249923 A1 * | 11/2006 | Ramsey .................. | 280/124.131 |
| 2007/0017715 A1 | 1/2007 | McCann | |
| 2008/0191449 A1 * | 8/2008 | Standen ....................... | 280/427 |
| 2011/0077822 A1 | 3/2011 | Lang et al. | |

* cited by examiner

*Primary Examiner* — Nicole Verley
(74) *Attorney, Agent, or Firm* — Brooks Kushman P.C.

(57) ABSTRACT

A trailer axle suspension system and a method of control. The trailer axle suspension system may be deflated when the trailer is approaching the dock and proximity of the trailer to the dock is within a predetermined limit.

14 Claims, 2 Drawing Sheets

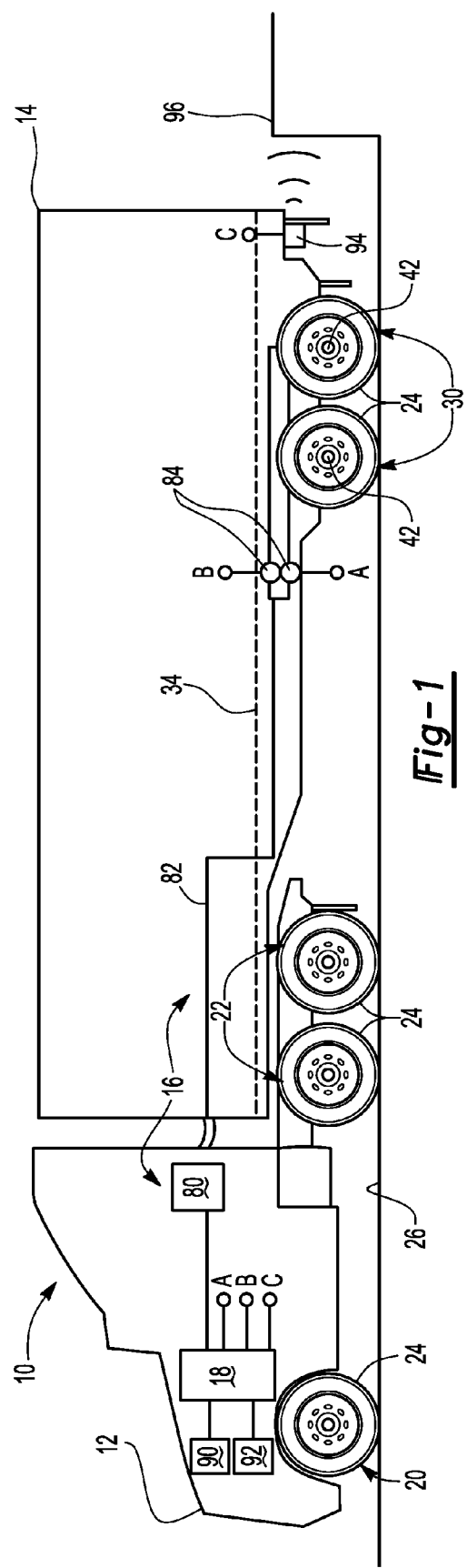
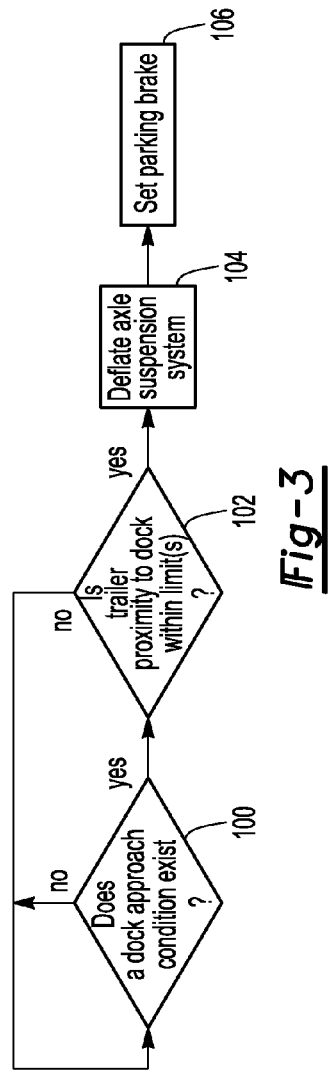

TRAILER AXLE SUSPENSION SYSTEM AND A METHOD OF CONTROL

TECHNICAL FIELD

The present application relates to a vehicle having a trailer axle suspension system and a method of control.

BACKGROUND

A trailer bogie slider control system is disclosed in U.S. patent publication no. 2007/0017715, which as been abandoned.

SUMMARY

In at least one embodiment, a method of controlling a trailer axle suspension system of a vehicle is provided. The method may include assessing proximity of a trailer to a dock when a dock approach condition exists and deflating the trailer axle suspension system when the trailer is approaching the dock and proximity of the trailer to the dock is within a predetermined limit.

In at least one embodiment, a method of controlling a trailer axle suspension system of a vehicle is provided. The method may include assessing proximity of a trailer to a dock when a dock approach condition exists and deflating air springs that are provided with an axle suspension system of the trailer before the trailer contacts the dock when the dock approach condition exists.

In at least one embodiment, a vehicle having a trailer that has an axle suspension system is provided. The vehicle may include an air spring that is provided with the axle suspension system to support a chassis of the trailer, a sensor configured to detect when the vehicle is moving in a reverse direction, and a dock proximity sensor. The dock proximity sensor may be disposed on the trailer and may be configured to detect a dock. The air spring may be deflated when the vehicle is moving in a reverse direction toward the dock and proximity of the trailer to the dock is within a predetermined limit.

BRIEF DESCRIPTION OF THE DRAWINGS

FIG. 1 is an illustration of an exemplary vehicle.

FIG. 3 is a flowchart of a method of controlling an air suspension system that may be provided with the vehicle.

DETAILED DESCRIPTION

Figure 2:
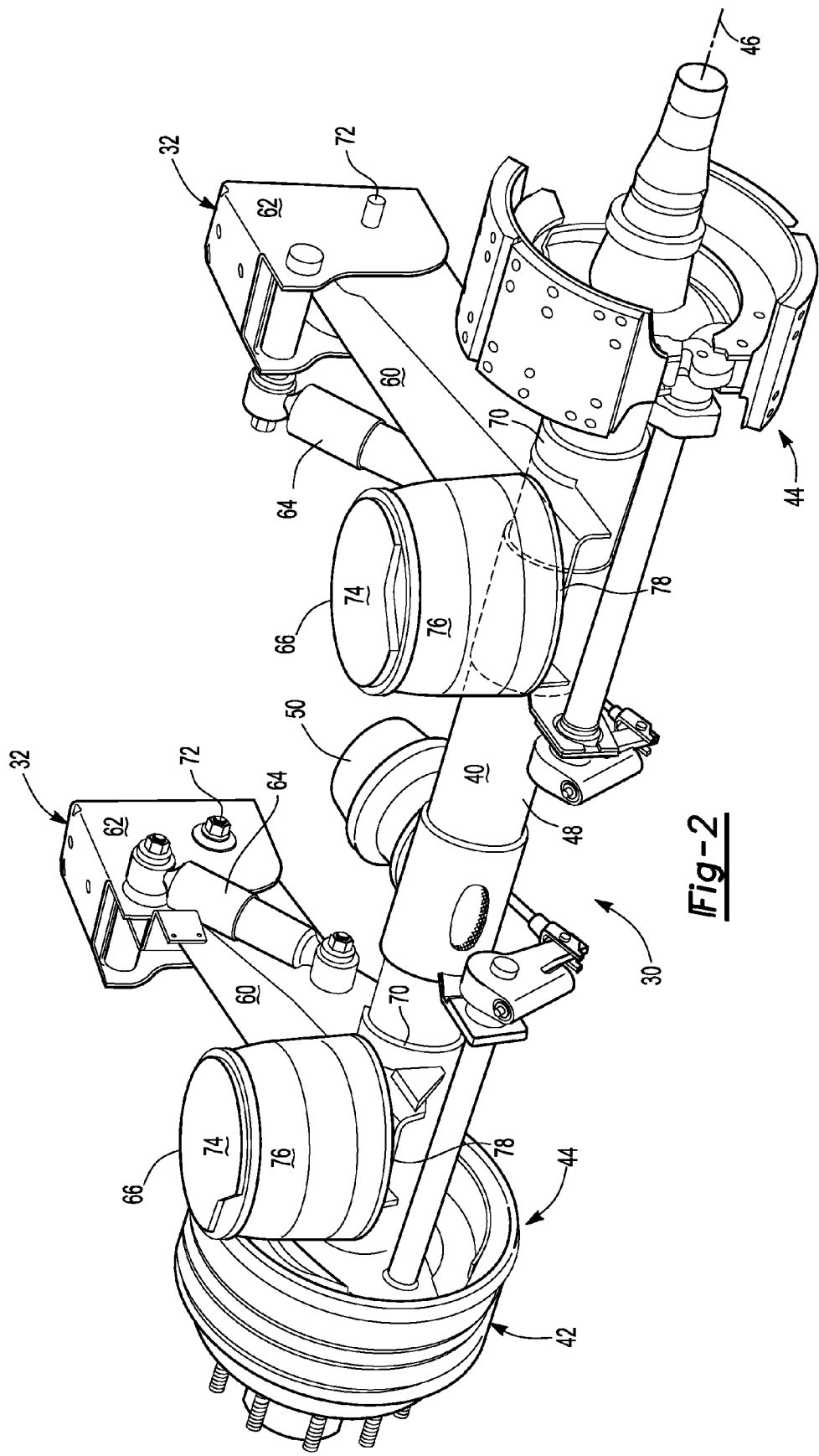
FIG. 2 is a perspective view of an axle assembly that may be provided with the vehicle.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring to FIG. 1, an exemplary vehicle 10 is shown. The vehicle 10 may be a motor vehicle that may be used to transport cargo. For example, the vehicle 10 may be configured as a truck and may include a tractor 12 and a trailer 14. In addition, the vehicle 10 may have a pressurized gas supply system 16 and a control system 18.

The tractor 12 may receive a driver and may propel and steer the vehicle 10. For example, the tractor 12 may have a front axle assembly 20 and at least one rear axle assembly 22. The front axle assembly 20 may be configured to steer the vehicle 10. In addition, the front axle assembly 20 and may or may not be configured as a drive axle that provides torque to at least one wheel assembly 24 that may include a tire mounted on a wheel. The wheel assembly 24 may be disposed on a support surface 26, like a road or the ground. The rear axle assembly 22 may be disposed rearward of the front axle assembly 20 and may configured as a drive axle in one or more embodiments. In FIG. 1, a tandem axle configuration is shown, but a different number of rear axle assemblies may be provided in various embodiments.

The trailer 14 may be coupled to the tractor 12 and may be configured to receive cargo. A front portion of the trailer 14 may extend over a rear axle assembly 22 of the tractor 12. The trailer 14 may have at least one axle assembly 30 and an axle suspension system 32, which is best shown in FIG. 2.

Referring to FIGS. 1 and 2, the axle assembly 30 may rotatably support at least one wheel assembly 24. The axle assembly 30 may be at least partially disposed under a frame or chassis 34 of the trailer 14 and near a rear portion or rear end of the trailer 14 that may be disposed opposite the tractor 12. The axle assembly 30 may include an axle 40, at least one wheel hub assembly 42, and a brake subsystem 44.

The axle 40 may extend along an axis 46 and may have an exterior surface 48. The exterior surface 48 may be an exterior circumference of the axle 40.

One or more wheel hub assemblies 42 may be rotatably disposed on the axle 40. For example, a wheel hub assembly 42 may be provided at each end of the axle 40 and each wheel hub assembly 42 may receive and support a wheel assembly 24. In FIG. 2, right end of the axle 40 is shown without a wheel hub assembly 42 to more clearly show a portion of the brake subsystem 44.

The brake subsystem 44 may be provided to brake or inhibit rotation of an associated wheel hub assembly 42. The brake subsystem 44 may be fixedly disposed on the axle 40 and may be spaced apart from the axle suspension system 32. In at least one embodiment, the brake subsystem 44 may be configured with a drum brake assembly that may be coupled to an actuator 50 that may be configured to actuate a brake pad.

The axle suspension system 32 may interconnect the axle assembly 30 to the chassis 34. In addition, the axle suspension system 32 and may dampen vibrations, provide a desired level of ride quality, and control trailer ride height or the distance between the chassis 34 and the support surface 26. The axle suspension system 32 may be configured as an air suspension system or an air ride suspension system that may employ air springs or air bellows that receive a pressurized gas as will be discussed in more detail below. In at least one embodiment, the axle suspension system 32 may include a suspension arm 60, a hanger 62, a shock absorber 64, and an air spring 66.

At least one suspension arm 60 may be fixedly coupled to the axle 40. In FIG. 2, two suspension arms 60 are provided that are spaced apart from each other. In at least one embodiment, the suspension arm 60 may include or be fixedly disposed on a suspension arm axle wrap 70 that may be disposed on or extend at least partially around the axle 40 to facilitate mounting of the suspension arm 60 to the axle 40. As such, the suspension arm axle wrap 70 may be positioned between the suspension arm 60 and the axle 40.

The hanger 62 may be pivotally disposed at an end of the suspension arm 60. The hanger 62 may be fixedly disposed with respect to the chassis 34. For instance, a top surface of the hanger 62 may be mounted to the chassis 34. The hanger 62 may receive a pivot pin 72 that may extend through the hanger 62 and the suspension arm 60. As such, the suspension arm 60 may pivot about the pivot pin 72 and pivot with respect to the hanger 62.

The shock absorber 64 may be provided to dampen shock impulses and dissipate kinetic energy. The shock absorber 64 may be mounted to the hanger 62 at a first end and to the suspension arm 60 at a second end.

An air spring 66 may be disposed proximate an end of the suspension arm 60 that is disposed opposite the hanger 62. For instance, the air spring 66 may be disposed above the axle 40 and under the chassis 34. The air spring 66 may receive a pressurized gas and may be configured to absorb shocks and vibrations to improve ride quality. The air spring 66 may support the chassis 34. For instance, a top plate 74 of the air spring 66 may be disposed proximate or may engage the chassis 34. Moreover, the top plate 74 may be fixedly coupled to the chassis 34 in one or more embodiments. A flexible bellows 76 may extend from the top plate 74 to or toward a bottom plate 78 that may be disposed opposite the top plate 74. The top plate 74, flexible bellows 76, and bottom plate 78 may cooperate to at least partially define a chamber within the air spring 66. The chamber may be fluidly connected to the pressurized gas supply system 16 via a port.

The pressurized gas supply system 16 may provide a pressurized gas or pressurized gas mixture, such as air, to the air spring 66. The term pressurized gas is used to generically reference a single gas or a gas mixture, such as air, that may be pressurized above atmospheric pressure by the pressurized gas supply system 16. As is best shown in FIG. 1, the pressurized gas supply system 16 may include a pressurized gas source 80, one or more conduits 82, and one or more valves 84.

The pressurized gas source 80 may include a tank or reservoir that contains a volume of pressurized gas and/or a pump or compressor that provides pressurized gas.

A conduit 82 may fluidly connect the pressurized gas source 80 to an air spring 66. A conduit 82 may have any suitable configuration, such as a hose, tubing, pipe, or combinations thereof.

One or more valves 84 may be provided to control the flow of pressurized gas through the conduit 82. For example, at least one valve 84 may enable or disable the flow of pressurized gas from the pressurized gas source 80 to at least one air spring 66. In FIGS. 1 and 2, two valves 84 are shown that are associated with different axle assemblies 30; however, a different number of valves 84 may be employed. For instance, a valve 84 may be associated with each individual air spring 66 or a single valve 84 may be associated with multiple axle assemblies 30. In addition, a valve 84 may enable or disable venting or the exhaust of pressurized gas from the air spring 66. A valve 84 may have any suitable configuration and may be actuated in any suitable manner, such as with a solenoid. The air spring 66 may be inflated by opening an associated valve 84 to provide pressurized gas from the pressurized gas source 80 to the air spring 66. The air spring 66 may be deflated by positioning the valve 84 such that pressurized gas is vented or exhausted from the air spring 66, such as by venting the pressurized gas to the surrounding environment.

The control system 18 may monitor and control operation of components and systems of the vehicle 10. The control system 18 may include at least one controller or control module that may monitor and/or control various components of the axle assembly 30, axle suspension system 32, and/or pressurized gas supply system 16. For example, the control system 18 may be configured to control the operation of the valves 84 and to control the flow of pressurized gas to the air spring 66 to control venting of pressurized gas from the air spring 66. The connection or communication between the control system 18 and the valves 84 is represented with connection nodes A and B.

The control system 18 may also communicate with various sensors or input devices. For instance, the control system 18 may be configured to receive a signal or data from a speed sensor 90, a reverse sensor 92, and a dock proximity sensor 94.

The speed sensor 90 may be configured to detect or provide data indicative of the speed of the vehicle 10. The speed sensor 90 may be of any suitable type. For example, the speed sensor 90 may detect the rotational speed of a drivetrain component or a wheel assembly 24.

The reverse sensor 92 may be configured to detect or provide data indicative of the selection of a reverse gear ratio or a reverse direction of travel of the vehicle 10. A reverse sensor 92 may be associated with a gearshift lever or similar operator input device for selection of a transmission gear ratio or a vehicle transmission.

The dock proximity sensor 94 may be configured to detect or provide data indicative of the proximity of the trailer 14 to a dock 96 where cargo may be loaded onto or unloaded from the trailer 14. The dock proximity sensor 94 may be provided with the trailer 14. For instance, dock proximity sensor 94 may be disposed at or near the rear end of the trailer 14. The dock proximity sensor 94 may be of any suitable type. For example, dock proximity sensor 94 may be a proximity sensor, optical sensor (e.g., light, laser or vision-based), radar-based sensor, lidar-based sensor, ultrasonic-based, or the like. As such, the dock proximity sensor 94 may detect the presence of the stationary dock 96 with respect to the trailer 14 and may provide data indicative of the distance to the dock 96 without physical contact with the dock 96 as represented by the curved lines emitted from the dock proximity sensor 94 in FIG. 1. The connection or communication between the control system 18 and the dock proximity sensor 94 is represented with connection node C.

A trailer 14 having an air suspension system or air ride suspension system may be prone to "dock walk" in which the trailer 14 may move away from the dock 96 in response to load forces. More specifically, the wheel assemblies 24 on a trailer axle assembly 30 may rotate in response to load forces exerted on the trailer 14 when the trailer air suspension system 32 is inflated and the trailer 14 is being loaded, such as when a forklift enters the trailer 14. As a forklift drives onto the trailer 14 or the trailer 14 is loaded with cargo, the trailer air suspension system 32 may be compressed, which in turn rotates the trailer wheel assemblies 24 forward or away from the dock 96. Successive loading trips made by the forklift or loading of the trailer 14 may create a ratcheting effect, which causes the trailer 14 to move further and further away from the dock 96.

Referring to FIG. 3, a flowchart of an exemplary method of control of the vehicle and trailer axle suspension system is shown. The method may be used to deflate a trailer axle suspension system to inhibit trailer "dock walk" and/or vertical movement or misalignment between a trailer and a dock due to varying cargo weight. As will be appreciated by one of ordinary skill in the art, the flowchart represents control logic which may be implemented or affected in hardware, software, or a combination of hardware and software. For example, the various functions may be affected by a programmed microprocessor. The control logic may be implemented using any of a number of known programming and processing techniques or strategies and is not limited to the order or sequence illustrated. For instance, interrupt or event-driven processing may be employed in real-time control applications rather than a purely sequential strategy as illustrated. Likewise, parallel processing, multitasking, or multi-threaded systems and methods may be used.

Control logic may be independent of the particular programming language, operating system, processor, or circuitry used to develop and/or implement the control logic illustrated. Likewise, depending upon the particular programming language and processing strategy, various functions may be performed in the sequence illustrated, at substantially the same time, or in a different sequence while accomplishing the method of control. The illustrated functions may be modified, or in some cases omitted, without departing from the spirit or scope intended.

At block 100, the method may begin by determining whether a dock approach condition exists. A dock approach condition may exist when the vehicle 10 or trailer 14 is approaching the dock 96. For example, the vehicle 10 may be approaching the dock 96 when the vehicle 10 is traveling at a low rate of speed in a reverse direction toward the dock 96. Data from the speed sensor 90 may be used to determine whether the vehicle 10 is traveling at a low rate of speed. For example, the vehicle 10 may be traveling at a low rate of speed when the speed data provided by the speed sensor 90 is less than a threshold speed value. A threshold speed value may be a predetermined value based on vehicle development testing, such as around 6 mph (10 kph). A determination as to whether the vehicle 10 is traveling in a reverse direction may be based on data from the reverse sensor 92. A determination as to whether the dock 96 is present or being approached may be based on data or information from the dock proximity sensor 94. For instance, the trailer 14 may be approaching the dock 96 when a stationary object is detected behind the trailer 14. The dock proximity sensor 94 may distinguish a dock 96 from other objects by detecting the width and/or height of an object. For instance, a dock 96 may be wider than the trailer 14 and may have a predetermined or standardized height to accommodate trailers made by various manufacturers. If a dock approach condition does not exist, the method may terminate or return to block 100 to continue monitoring. If a dock approach condition does exist, then the method may continue at block 102.

At block 102, the proximity of the trailer 14 to the dock 96 may be assessed. The proximity of the trailer 14 to the dock 96 may be assessed with the objective of deflating the air suspension system 32 of the trailer 14 before the trailer 14 reaches the dock 96.

Trailer proximity with respect to the dock 96 may be assessed in multiple ways. For example, trailer proximity may be based solely on the distance between the trailer 14 and the dock 96. The distance between the trailer 14 and the dock 96 may be based on data from the dock proximity sensor 94 and may be compared to one or more predetermined threshold distance values. Predetermined threshold distance value(s) may be established by vehicle development testing and may be greater than or equal to a distance at which one or more air springs 66 can be fully deflated prior to the trailer 14 reaching or contacting the dock 96. For instance, a single threshold distance value may be used such that deflation of the air springs 66 is initiated when the trailer 14 reaches a predetermined threshold distance from the dock 96. The predetermined threshold distance value may include a factor of safety to provide sufficient time or distance to accommodate deflation of the air springs 66 in the event of minor variations in the speed at which the trailer 14 approaches the dock 96.

As another example, trailer proximity may be based on a predicted time until the trailer 14 contacts the dock 96. The predicted time to contact may be based on data from the dock proximity sensor 94 and may accommodate changes in the rate at which the trailer 14 approaches the dock (i.e., changes in the approach velocity of the trailer 14 to the dock 96). Such an assessment may be based on data from the speed sensor 90 indicative of the speed at which the vehicle 10 is traveling and the distance from the trailer 14 to the dock 96 to calculate a predicted dock contact time or predicted time to contact. The predicted time to contact may be compared to a predetermined threshold time value. The predetermined threshold time value may be established by vehicle development testing and may be greater than or equal to a time to fully deflate one or more air springs 66. The predetermined threshold time value may include a factor of safety to provide additional time or distance to accommodate deflation of the air springs 66.

If the distance to the dock 96 is greater than the predetermined threshold distance value or the predicted time to contact is greater than the threshold time value, then the method may return to block 100 or block 102. If the distance to the dock is not greater than the predetermined threshold distance value or the predicted time to contact is not greater than the threshold time value, then the method may continue at block 104.

At block 104, the trailer axle suspension system 32 may be deflated. The trailer axle suspension system 32 may be deflated by actuating a valve 84 to vent or exhaust gas from one or more air springs 66 associated with one or more axle assemblies 30 of the trailer 14. Pressurized gas may be exhausted from the air springs 66 while the vehicle 10 is moving in a reverse direction and/or at a low rate of speed as previously discussed. In addition, pressurized gas may be vented or exhausted from an air spring 66 at a fixed rate or variable rate. Pressurized gas may be exhausted at a fixed rate by opening an associated valve 84 without further adjustment. Pressurized gas may be exhausted at a variable rate by modulating the valve 84 to adjust the pressurized gas flow rate to help more rapidly deflate the air spring 66 before contact with the dock 96 when the rate of approach of the trailer 14 to the dock 96 increases.

At 106, the parking brake may be set. The parking brake may be part of the brake subsystem 44. The parking brake may be set manually or automatically when the axle suspension system 32 is deflated and the trailer 14 is in a stationary position at the dock 96. The axle suspension system 32 may be deflated when the valve 84 is opened for a sufficient amount of time to deflate the air spring 66. A sufficient amount of time may be based on vehicle development testing in which the volume of the air spring 66 and rates at which air may be vented from the air spring 66 are tabulated to determine a minimum amount of time to deflate the air spring 66 or to create a lookup table having data indicative of expected deflation times or venting flow rates. A determination as to whether the vehicle 10 or trailer 14 is in a stationary position based on the data from the speed sensor 90. A determination as to whether the vehicle 10 or trailer 14 is at the dock 96 may be based on data from the dock proximity sensor 94.

The method may also inhibit a driver or operator from moving the vehicle 10 forward and away from the dock 96 until the trailer axle suspension system 32 is reinflated. For instance, the method may inhibit the operation of a powertrain components or the release of the parking brake until the trailer axle suspension system 32 is reinflated. Optionally, the method may automatically inflate the trailer axle suspension system 32 when the parking brake is released and/or a forward gear ratio is selected.

The method and vehicle configuration described above may be employed to inhibit trailer dock walk or undesired trailer movement with respect to a dock. Moreover, dock walk may be inhibited without the use of wheel chocks or trailer restraint systems, such as a metal hook mounted to the base of the dock that hooks onto the chassis or bumper of a trailer 14 or trailer-mounted kickstands that may increase trailer costs and fail to deploy or otherwise provide unsatisfactory performance. In addition, the method and vehicle configuration may automatically deflate a trailer air suspension system prior to dock contact and engagement of the parking brake, thereby avoiding failure to manually deflate the air suspension or similar manual operator error. Similarly, the method may also automatically inflate a trailer air suspension system prior to allowing the operator to depart from the dock.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of controlling a trailer axle suspension system of a vehicle comprising:
   assessing proximity of a trailer to a dock when a dock approach condition exists; and
   deflating the trailer axle suspension system when the trailer is approaching the dock and proximity of the trailer to the dock is within a predetermined limit.

2. The method of claim 1 wherein deflating the trailer axle suspension system includes deflating an air spring of the trailer axle suspension system.

3. The method of claim 2 wherein the air spring is deflated before the trailer contacts the dock.

4. The method of claim 3 wherein the air spring is deflated at a fixed rate.

5. The method of claim 3 wherein the air spring is deflated at a variable rate based on a rate at which the trailer is approaching the dock.

6. The method of claim 2 wherein the air spring is inflated with a pressurized gas prior to releasing a parking brake and moving the trailer away from the dock.

7. The method of claim 1 wherein the dock approach condition exists when the trailer is moving in a reverse direction and the dock is detected with a dock proximity sensor.

8. The method of claim 7 wherein the dock proximity sensor is disposed proximate a rear end of the trailer that is disposed opposite a tractor to which the trailer is coupled.

9. The method of claim 1 wherein proximity of the trailer to the dock is within the predetermined limit when a predicted time until the trailer contacts the dock is less than a threshold time value.

10. The method of claim 1 wherein proximity of the trailer to the dock is within a predetermined limit when a distance between the trailer and the dock is not greater than a predetermined threshold distance value.

11. The method of claim 1 wherein a parking brake is set after the trailer axle suspension system is deflated and the trailer is stationary.

12. The method of claim 1 wherein a dock approach condition exists when the trailer is moving in a reverse direction.

13. The method of claim 12 wherein a dock approach condition exists when a tractor to which the trailer is coupled in a reverse gear.

14. The method of claim 13 wherein a dock approach condition exists when the tractor is moving in a reverse direction at a speed that is less than a threshold speed value.

* * * * *